United States Patent
Yanosik et al.

(10) Patent No.: US 10,907,511 B2
(45) Date of Patent: Feb. 2, 2021

(54) SYSTEM AND METHOD FOR RECOVERING TURBINE SYSTEM EXTRACTIONS

(71) Applicant: General Electric Company, Schenectady, NY (US)

(72) Inventors: Edward Michael Yanosik, Liberty Township, OH (US); Daniel Aaron Kessler, Houston, TX (US)

(73) Assignee: General Electric Company, Schenectady, NY (US)

( * ) Notice: Subject to any disclaimer, the term of this patent is extended or adjusted under 35 U.S.C. 154(b) by 583 days.

(21) Appl. No.: 15/270,892

(22) Filed: Sep. 20, 2016

(65) Prior Publication Data
US 2018/0080347 A1 Mar. 22, 2018

(51) Int. Cl.
*F01K 23/10* (2006.01)
*F02C 7/18* (2006.01)
*F02C 9/18* (2006.01)
*F02C 6/18* (2006.01)
*F01K 13/02* (2006.01)

(52) U.S. Cl.
CPC .......... *F01K 23/101* (2013.01); *F01K 13/02* (2013.01); *F02C 6/18* (2013.01); *F02C 7/18* (2013.01); *F02C 9/18* (2013.01); *Y02E 20/14* (2013.01); *Y02E 20/16* (2013.01); *Y02E 20/32* (2013.01)

(58) Field of Classification Search
CPC ........ F01K 23/10; F01K 23/101; F01K 13/02; F02C 6/08; F02C 6/18; F02C 7/18; F02C 9/18; F02C 30/34; Y02E 20/14; Y02E 20/16; Y02E 20/236

USPC ......................................................... 60/773
See application file for complete search history.

(56) References Cited

U.S. PATENT DOCUMENTS

| | | | |
|---|---|---|---|
| 5,308,810 A * | 5/1994 | Voss | B01D 53/8628 423/239.1 |
| 8,408,003 B2 | 4/2013 | Hardwicke et al. | |
| 8,631,658 B2 | 1/2014 | MacAdam et al. | |
| 2012/0260667 A1 * | 10/2012 | Chillar | F02C 6/08 60/779 |

* cited by examiner

Primary Examiner — Jesse S Bogue
Assistant Examiner — Loren C Edwards
(74) Attorney, Agent, or Firm — Fletcher Yoder, P.C.

(57) ABSTRACT

An embodiment includes a power production system having a compressor system compressing a fluid. The system further includes a combustor system combusting compressed fluid and a fuel. The system additionally includes a turbine system configured produce power and an exhaust stream and a first exhaust processing system fluidly coupled to the turbine system and configured to receive the exhaust stream. The system also includes a first bleed system fluidly coupled to a first location in the compressor system, to a second location downstream of the compressor system and upstream of the first exhaust processing system, to a third location in the first exhaust processing system, to a fourth location downstream of the first exhaust processing system, or a combination thereof, and configured to redirect a first compressor extraction from the first location to the second location, to the third location, to the fourth location, or to the combination thereof.

12 Claims, 4 Drawing Sheets

SYSTEM AND METHOD FOR RECOVERING TURBINE SYSTEM EXTRACTIONS

BACKGROUND OF THE INVENTION

The subject matter disclosed herein relates to turbine systems, and more specifically, to systems and methods for recovering turbine system extractions.

Gas turbine systems typically include a compressor for compressing a working fluid, such as air, a combustor for combusting the compressed working fluid with fuel, and a turbine for turning the combusted fluid into a rotative power. For example, the compressed air is injected into a combustor which heats the fluid causing it to expand, and the expanded fluid is forced through the turbine. In certain waste energy recovery systems, exhaust from the turbine may be provided to a downstream device such as a heat exchanger. The heat exchanger may recover additional thermal energy from the exhaust by and convert it to a more usable form, such as, but not limited to, steam suitable to power one or more steam turbines. It would be beneficial to improve energy recovery of certain waste energy recovery systems.

BRIEF DESCRIPTION OF THE INVENTION

In one embodiment, a power production system includes a compressor system configured to compress a fluid into a compressed fluid. The power production system further includes a combustor system fluidly coupled to the compressor system and configured to combust the compressed fluid and a fuel to produce a combustion fluid. The power production system additionally includes a turbine system fluidly coupled to the combustor system and configured to rotatively power a shaft via the combustion fluid and to produce an exhaust stream. The power production system also includes a first exhaust processing system fluidly coupled to the turbine system and configured to receive the exhaust stream. The power production system further includes a first bleed system fluidly coupled to a first location in the compressor system, to a second location downstream of the compressor system and upstream of the first exhaust processing system, to a third location in the first exhaust processing system, to a fourth location downstream of the first exhaust processing system, or a combination thereof, and configured to redirect a first compressor extraction from the first location to the second location, to the third location, to the fourth location, or to the combination thereof.

In a second embodiment, a power production system includes a controller comprising a processor. The processor is configured to a) sense operations of the power production system. The power production system includes a compressor system configured to compress a fluid into a compressed fluid and a combustor system fluidly coupled to the compressor system and configured to combust the compressed fluid and a fuel to produce a combustion fluid. The power production system further includes a turbine system fluidly coupled to the combustor system and configured to rotatively power a shaft via the combustion fluid and to produce an exhaust stream and a first exhaust processing system fluidly coupled to the turbine system and configured to receive the exhaust stream. The power production system additionally includes a first bleed system fluidly coupled to a first location in the compressor system, to a second location downstream of the compressor system and upstream of the first exhaust processing system, to a third location in the first exhaust processing system, to a fourth location downstream of the first exhaust processing system, or a combination thereof, and configured to redirect a first compressor extraction from the first location to the second location, to the third location, to the fourth location, or to the combination thereof. The processor is further configured to b) redirect the first compressor extraction from the first location to the second location, to the third location, to the fourth location, or to the combination thereof.

In a third embodiment, a method for controlling power production operations includes a) sensing operations of a power production system via a processor. The power production system includes a compressor system configured to compress a fluid into a compressed fluid and a combustor system fluidly coupled to the compressor system and configured to combust the compressed fluid and a fuel to produce a combustion fluid. The power production system further includes a turbine system fluidly coupled to the combustor system and configured to rotatively power a shaft via the combustion fluid and to produce an exhaust stream and a first exhaust processing system fluidly coupled to the turbine system and configured to receive the exhaust stream. The power production system additionally includes a first bleed system fluidly coupled to a first location in the compressor system, to a second location downstream of the compressor system and upstream of the first exhaust processing system, to a third location in the first exhaust processing system, to a fourth location downstream of the first exhaust processing system, or a combination thereof, and configured to redirect a first compressor extraction from the first location to the second location, to the third location, to the fourth location, or to the combination thereof. The method further includes c) redirecting a third compressor extraction from the ninth location to the tenth location, to the eleventh location, to the twelfth location, or to the combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain power generation systems that include a gas turbine fluidly coupled to a waste heat recovery system, such as a combined cycle power generation system, may enhance energy recovery by directing an exhaust stream from the gas turbine into the heat exchanger. The heat exchanger may then convert thermal energy in the exhaust stream into a more usable form, typically by vaporizing a fluid which may then be used to power one or more energy extraction devices such as turbines. However, particularly during startup operations of the waste heat recovery system, the exhaust stream may be at elevated temperatures that could damage portions of the waste heat recovery system. Accordingly, certain waste heat recovery systems may include air attemperation. In air attemperation, one or more attemperation fans may be used to cool the exhaust stream before entry of the exhaust stream into certain components of the waste heat recovery system. The cooler exhaust stream may thus be used to start up the waste heat recovery system in a more thermally-controlled manner.

The techniques described herein may be used in lieu of or additional to air attemperation (or other attemperation techniques) by directing cooler fluid from the turbine system itself. For example, cooler fluid may be directed via variable bleed valve system disposed in the turbine system into the exhaust stream entering the waste heat recovery system for cooling of the exhaust stream. Indeed, rather than directing variable bleed valve (VBV) controlled fluid directly to the atmosphere, the techniques described herein may transfer the VBV controlled fluid to the exhaust stream. Additionally or alternatively, the cooler VBV controlled fluid may be directed into other waste heat recovery system subsystems where fluid having certain temperature characteristics may be useful, as further described below.

Other systems, such as catalytic converter systems, may also benefit from the cooler fluid, and may thus also be recipient systems for the cooler fluid. By recovering gas turbine system extractions for further use, the techniques described herein may enable a more energy efficient gas turbine system which may additionally reduce or eliminate the use of air attemperation. In certain embodiments, fluid extractions from other sections of the compressor may be used to cool (or heat) systems downstream of the compressor. For example, compressor extractions may be directed to exhaust streams, sections of the waste heat recovery system, and/or other systems such as catalytic converter system. By providing for techniques to redirect turbine system extractions to other sections and/or systems, the techniques described herein may enable a more energy efficient turbine system, and reduce or eliminate the use of certain components (e.g., attemperation fans).

Figure 1:
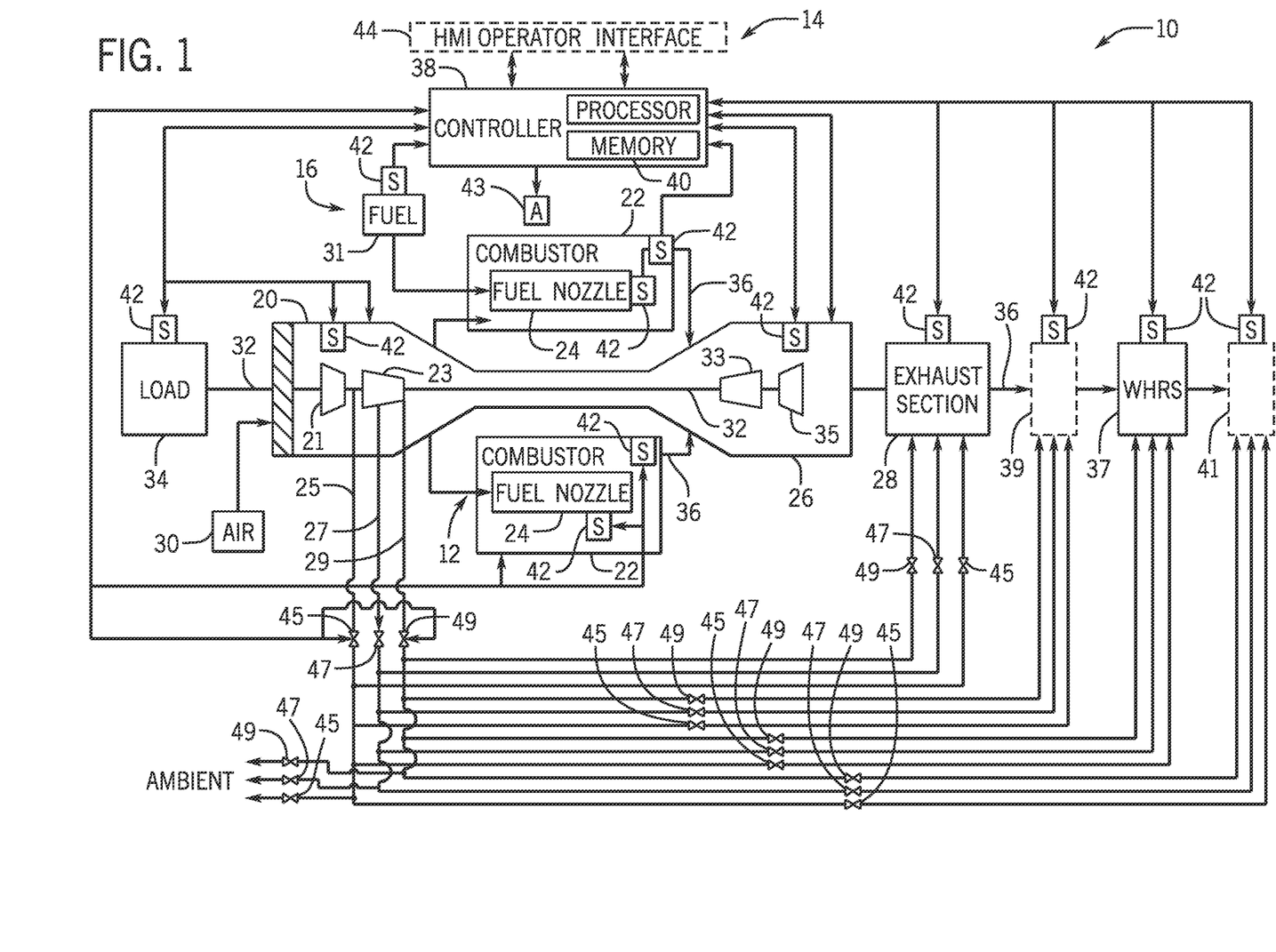
FIG. 1 is a schematic diagram of an embodiment of a power generation system having a plurality of bleed or extraction systems.

Turning now to FIG. 1, the figure is a diagram illustrating a power generation system 10, such as a power plant, that includes a gas turbine system 12, a monitoring and control system 14, a fuel supply system 16, and a waste heat recovery system 37. The gas turbine engine or system 12 may include a compressor section 20, combustion systems 22, fuel nozzles 24, a turbine section 26, and an exhaust section 28. The compressor section 20 may include any number of compressors, depicted as a low pressure compressor 21, a high pressure compressor 23, and one or more bleed systems 25, 27, 29. The turbine section 26 may include any number of turbines, depicted as a high pressure turbine 33 and a low pressure turbine 35.

During operation, the gas turbine system 12 may pull oxidant such as air 30 through an inlet guide vane system having vanes that may be positioned at a variety of angles to optimize intake of the air 30 and operations of the gas turbine system 12. The air 30 may enter into the compressor section 20, which may then compress the air 30 and move the air 30 to the combustion system 22 (e.g., which may include a number of combustors). More specifically, the compressor section 20 may first use the low pressure compressor 21 (e.g., booster) to compress the air, followed by further compression in the high pressure compressor 23.

In certain embodiments of the turbine system 12, one or more bleed systems may be provided, such as the variable bleed valve (VBV) system 25, the compressor interstage bleed system 27, and the compressor discharge bleed system 29. The VBV system 25 may redirect fluid and/or debris from an outlet of the low pressure compressor 21, thus adjusting airflow into the high pressure compressor 23. Such adjustments may be used to maintain adequate operability margin and to improve fuel consumption and energy efficiency, for example, during startup operations for the turbine system 12. The compressor interstage bleed system 27 may redirect fluid recovered from one or more stages of the high pressure compressor 23. For example, the interstage bleed system 27 may aid in tuning the performance and operability characteristics of the gas turbine. The compressor discharge bleed system 29 may redirect fluid recovered from an outlet section of the high pressure compressor 23. For example, the compressor discharge bleed system 29 may also aid in tuning the performance and operability characteristics of the gas turbine.

Before the techniques described herein, the VBV system 25, the compressor interstage bleed system 27, and the compressor discharge bleed system 29 may have always redirected bleed fluid to ambient. That is, the fluid from the compressor section 20 may have been sent to the atmosphere. The techniques described herein enable fluid from the one or more bleed systems 25, 27, 29 to be reused, for example, by redirecting the fluid to the exhaust section 28, to a waste heat recovery system 37, and/or to other systems 39, 41. The waste heat recovery system 37 may be referred to as an exhaust processing system because it processes gas turbine exhaust. Likewise, the other systems 39, 41, may also process gas turbine exhaust, and be referred to as exhaust processing systems. The other systems 39, 41 may include catalytic converter systems, heat exchangers, and so on, and may be disposed upstream and/or downstream from the waste heat recovery system 37, or internal to the waste heat recovery system 37. By recovering fluid, e.g., compressor 20 fluid, for other uses, the techniques described herein may improve energy efficiency and reduce component wear and tear for the power production system 10, as further described below.

In the combustion system 22, the fuel nozzle 24 (or a number of fuel nozzles 24) may inject fuel that mixes with the compressed air 30 to create, for example, an air-fuel mixture. The air-fuel mixture may combust in the combustion system 22 to generate hot combustion gases, which flow downstream into the turbine section 26 to drive one or more turbine stages. In certain embodiment, the combustion system 22 is a dry low emissions (DLE) combustion system 22 suitable for reducing nitrogen oxides (NOx) emission, for example, by using a lean premixed combustion and/or without using water or steam to reduce combustion temperatures.

The combustion gases may move through the turbine section 26 to drive one or more stages of turbine blades, which may in turn drive rotation of a shaft system 32. The shaft system 32 may connect to a load 34, such as a generator that uses the torque of the shaft 32 to produce electricity. After passing through the turbine section 26, the hot combustion gases may vent as exhaust gases 36 into the waste heat recovery system 37 and/or other systems 39, 41 via exhaust section 28. The exhaust gas 36 may include gases such as carbon dioxide ($CO_2$), carbon monoxide (CO), $NO_x$, and so forth. In combined cycle systems, such as the power plant 10, hot exhaust 36 may flow from the gas turbine 26 and pass to the waste heat recovery system 37, where it may be used to generate high-pressure, high-temperature vapor, such as steam. The vapor produced by the waste heat recovery system 37 may then be passed through a turbine, or similar expansion device, for further power generation. In certain embodiments, the produced vapor may also be supplied to any other processes in part or in entirety. Examples would include the use of produced steam in paper-making processes or in district heating applications. The gas turbine engine generation cycle is often referred to as the "topping cycle," whereas the waste heat recovery cycle is often referred to as the "bottoming cycle." Combining these two cycles may lead to greater efficiencies in both cycles. In particular, exhaust heat from the topping cycle may be captured and used to generate vapor for use in the bottoming cycle.

In certain embodiments, the system 10 may also include a controller 38. The controller 38 may be communicatively coupled to a number of sensors 42, a human machine interface (HMI) operator interface 44, and one or more actuators 43 suitable for controlling components of the system 10. The actuators 43 may include valves 45, 47, 49 switches, positioners, pumps, and the like, suitable for controlling the various components of the system 10. The controller 38 may receive data from the sensors 42, and may be used to control the compressor section 20, the combustors 22, the turbine section 26, the exhaust section 28, the load 34, to direct VBV 25 fluid flow, compressor interstage bleed system 27 fluid flow, and compressor discharge bleed system 29 fluid flow. Indeed, the controller 38 may be operatively coupled to the bleed systems 25, 27, and 29 to direct fluid to the exhaust section 28, the waste heat recovery system 37, and/or other systems 39, 41.

For example, the controller 38 may be operatively coupled to valves 45 to direct fluid from the VBV 25 to the exhaust section 28, to the waste heat recovery system 37, to other systems 39, 41, and/or to ambient. Likewise, controller 38 may be operatively coupled to valves 47 to direct fluid from the compressor interstage bleed system 27 to the exhaust section 28, to the waste heat recovery system 37, to other systems 39, 41, and/or to ambient. Similarly, the controller 38 may be operatively coupled to valves 49 to direct fluid from the compressor discharge bleed system 29 to the exhaust section 28, to the waste heat recovery system 37, to other systems 39, 41, and/or to ambient.

In certain embodiments, the HMI operator interface 44 may be executable by one or more computer systems of the system 10. A plant operator may interface with the industrial system 10 via the HMI operator interface 44. Accordingly, the HMI operator interface 44 may include various input and output devices (e.g., mouse, keyboard, monitor, touch screen, or other suitable input and/or output device) such that the plant operator may provide commands (e.g., control and/or operational commands) to the controller 38. Further, operational information from the controller 38 and/or the sensors 42 may be presented via the HMI operator interface 44. Similarly, the controller 38 may be responsible for controlling one or more final control elements coupled to the components (e.g., the compressor section 20, the turbine section 26, the combustors 22, the load 34, and so forth) of the industrial system 10 such as, for example, one or more actuators, valves, transducers, and so forth. For example, the operator may use the HMI operator interface 44 to direct bleed system 25, 27, and/or 29 fluid flow to the waste heat recovery system 37, to other systems 39, 41, and/or to ambient.

In certain embodiments, the sensors 42 may be any of various sensors useful in providing various operational data to the controller 38. For example, the sensors 42 may provide pressure and temperature of the compressor section 20, speed and temperature of the turbine section 26, vibration of the compressor section 20 and the turbine section 26, $CO_2$ levels in the exhaust gas 36, carbon content in the fuel 31, temperature of the fuel 31, temperature, pressure, clearance of the compressor section 20 and the turbine section 26 (e.g., distance between the compressor section 20 and the turbine section 26 and/or between other stationary and/or rotating components that may be included within the industrial system 10), flame temperature or intensity, vibration, combustion dynamics (e.g., fluctuations in pressure, flame intensity, and so forth), load data from load 34, output power from the turbine section 26, and so forth.

The controller 38 may include a processor(s) (e.g., a microprocessor(s)) that may execute software programs to perform the disclosed techniques. Moreover, the processor may include multiple microprocessors, one or more "general-purpose" microprocessors, one or more special-purpose microprocessors, and/or one or more application specific integrated circuits (ASICS), or some combination thereof. For example, the processor may include one or more reduced instruction set (RISC) processors. The controller 38 may include a memory device 40 that may store information such as control software, look up tables, configuration data, etc. The memory device 40 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

The memory device 40 may store a variety of information, which may be suitable for various purposes. For example, the memory device 40 may store machine-readable and/or processor-executable instructions (e.g., firmware or software) for the processor execution. In one embodiment, the instructions, when executed, cause the processor to redirect fluid flows to the exhaust section 28, to the waste heat recovery system 37, to other systems 39, 41, and/or to ambient from the bleed systems 25, 27, and 29. It is to be understood that the valve arrangement shown for the bleed systems 25, 27, and 29 is an example only, and any valve and/or manifold arrangement may be used that is suitable for directing compressor fluid to the exhaust section 28, to the waste heat recovery system 37, to other systems 39, 41, and/or to ambient.

Figure 2:
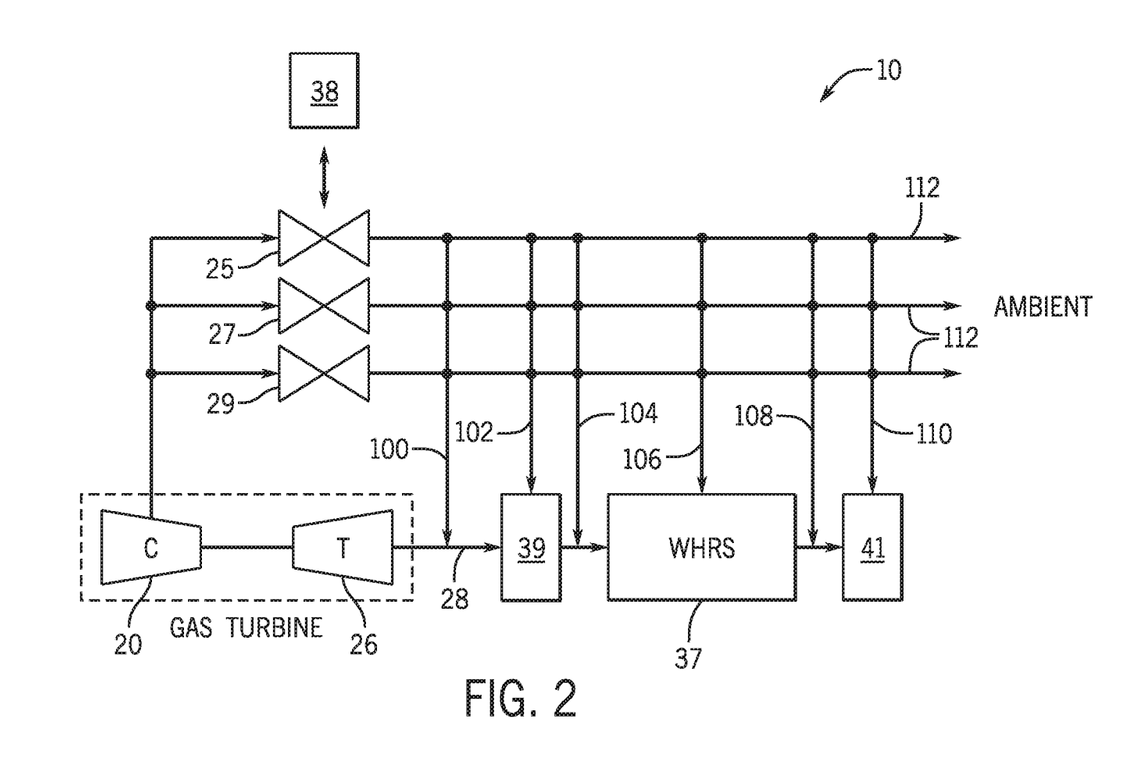
FIG. 2 is a block diagram of the power generation system of FIG. 1 having three bleed or extraction systems.

To further illustrate the compressor extractions flows, FIG. 2 is a simplified block diagram of an embodiment of the power generation system 10 showing the bleed systems 25, 27, and 29. More specifically, the figure illustrates that the controller 38 is communicatively coupled to the VBV system 25, the compressor interstage bleed system 27, and the compressor discharge bleed system 29. Based on certain fluid parameters, such as pressure, temperature, flow, and so on, the controller 38 may direct the VBV system 25, the compressor interstage bleed system 27, and/or the compressor discharge bleed system 29 to redirect fluid from the compressor 20 into the exhaust section 28 via conduits 100, thus providing for a cooler or hotter exhaust 36. Likewise, the controller 38 may, based on the fluid parameters, redirect fluid from the compressor 20 into the other systems 39 via conduits 102. Furthermore, based on the fluid parameters, the controller 38 may redirect fluid from the compressor 20 into an inlet for the waste heat recovery system 37 via conduits 104.

The controller 38 may also, based on the fluid parameters, redirect fluid from the compressor 20 into the waste heat recovery system 37 via conduits 106. Further, the controller 38, based on the fluid parameters, may redirect fluid from the compressor 20 into an outlet of the waste heat recovery system 37 via conduits 108. Similarly, based on the fluid parameters, the controller 38 may redirect fluid from the compressor 20 into the other systems 41 via conduits 110. Furthermore, based on the fluid parameters, the controller 38 may redirect fluid from the compressor 20 into ambient via the conduits 112. By redirecting compressor 20 fluid, the controller 38 may more efficiently utilize energy in the fluid and may thus result in improved operations for the power production system 10. Additionally, certain equipment, such as attemperation fans may no longer be needed, thus improving cost and reducing maintenance by not having to use the attemperation fans.

Figure 3:
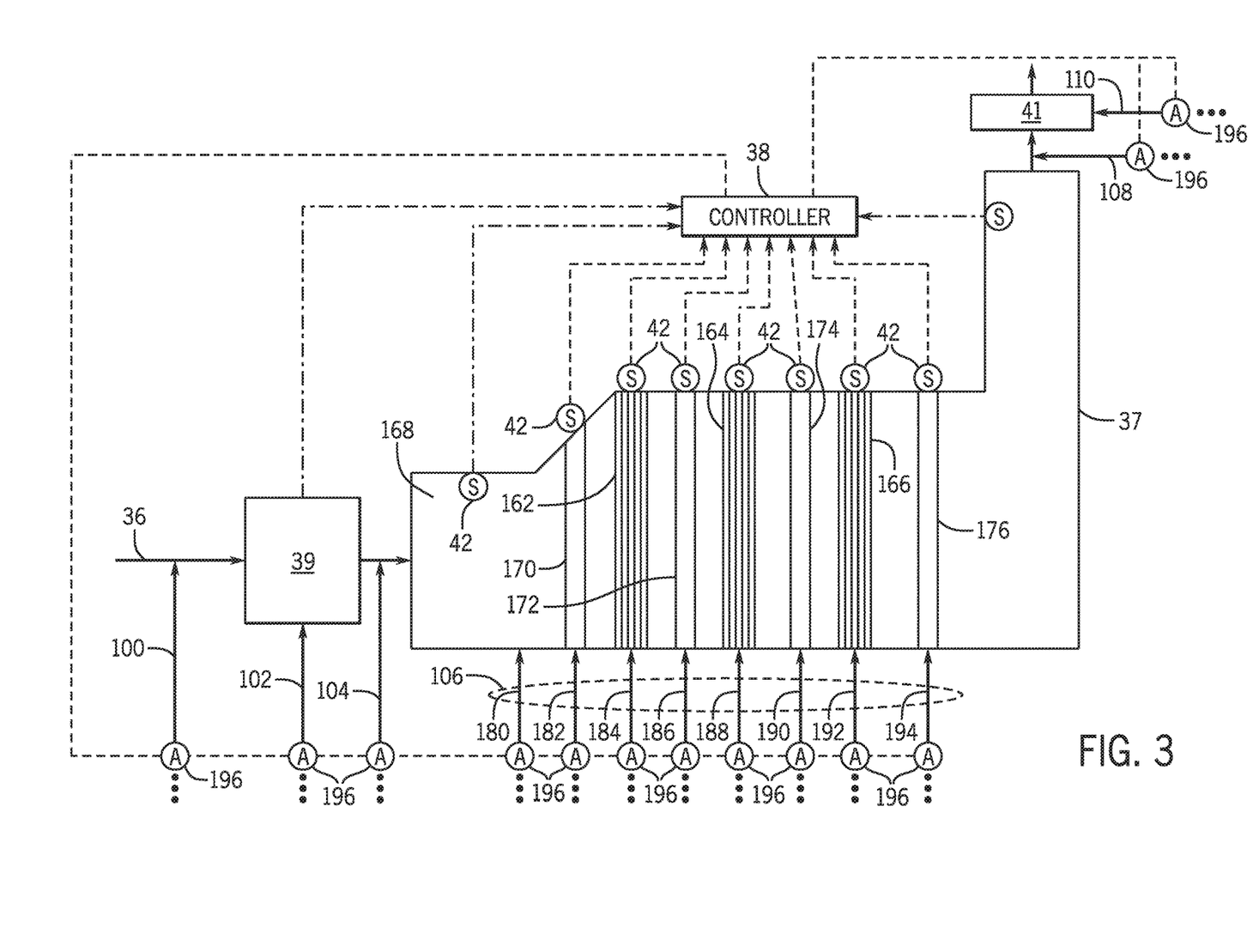
FIG. 3 is a block diagram of an embodiment of a waste heat recovery system and other systems showing details of certain conduits.

FIG. 3 is a block diagram of a detail view of an embodiment of the waste heat recovery system 37. As shown in FIG. 3, the waste heat recovery system 37 includes a high-pressure section 162, an intermediate-pressure section 164, and a low-pressure section 166. The high-pressure section 162 generates high-pressure vapor, the intermediate-pressure section 164 generates intermediate-pressure vapor, and the low-pressure section 166 generates low-pressure vapor. The high-pressure section 162 is located near an inlet section 168 of the waste heat recovery system 138. As the temperature of heated exhaust gas 36 from the gas turbine 26 may be highest near the high-pressure section 162, the high-pressure section 162 generates high-pressure vapor. In other words, the high temperature of the heated exhaust gas 36 near the high-pressure section 162 provides sufficient heat to produce the high-pressure vapor. As shown in the figure, the heated exhaust gas 36 may first be processed by other systems 39 and may then enter the waste heat recovery system 37 in the inlet section 168. In other embodiments, the other systems 39 may not be used and the exhaust gas 36 may enter the inlet section 168 directly. In one embodiment, the waste heat recovery system 37 is a heat recovery steam generation (HRSG) system that may process turbine exhaust to generate steam power, which may then be used to generate electricity via one or more steam turbines.

The waste heat recovery system 37 may include systems 170, 172, 174, and 176 disposed upstream of the high pressure section 162, upstream of the intermediate-pressure section 164, upstream of the low pressure section 166, and downstream of the low pressure section 166, respectively. The systems 170, 172, 174, 176 may include catalytic converter systems to remove certain pollutants from the exhaust stream 36. For example, the catalytic converter systems may include selective catalytic reduction [SCR] systems, two-way catalytic converter systems, three-way catalytic converter systems, carbon monoxide [CO] catalytic converter systems, or a combination thereof. SCR systems may remove nitrogen oxides (NOx) by adding ammonia and/or urea to the exhaust stream 36. Two-way catalytic converter systems may oxidize carbon monoxide to carbon dioxide and may oxidize hydrocarbons to carbon dioxide and water. Three-way catalytic converter systems may reduce NOx to nitrogen and oxygen, oxidize carbon monoxide to carbon dioxide, and oxidize hydrocarbons to carbon dioxide and water. CO catalytic converter systems may remove CO from the exhaust stream 36. As mentioned previously, it may be beneficial to redirect certain compressor 20 extractions to the waste heat recovery system 37 and/or other systems 39, 41. Accordingly, the figure shows the conduits 100, 102, 104, 106, 108, and 110, that may be used to provide the compressor 20 extractions, including extractions redirected via the VBV 25, the compressor interstage bleed system 27, and compressor discharge bleed system 29.

The conduits 106 may include conduits 180, 182, 184, 186, 188, 190, 192, and 194. The conduits 180 may direct fluid to the inlet section 168. The conduits 182 may direct fluid to the systems 170. The conduits 184 may direct fluid to the high pressure section 162. The conduits 186 may direct fluid to the systems 172. The conduits 188 may direct fluid to the intermediate-pressure section 164. The conduits 190 may direct fluid to the systems 174. The conduits 192 may direct fluid to the low pressure section 166. The conduits 194 may direct fluid to the systems 176. In use, the controller 188 may sense operations, for example, via sensors 42, and then use actuators 190 to direct the fluid flow. Actuators 190 may include the valves 45, 47, 49 as well as pumps, blowers, and the like. Based on certain sensed conditions, as described in more detail below, the controller 38 may actuate the actuators 196 to direct fluid to any (or all) of the conduits 100, 102, 104, 106, 108, and 110.

Figure 4:
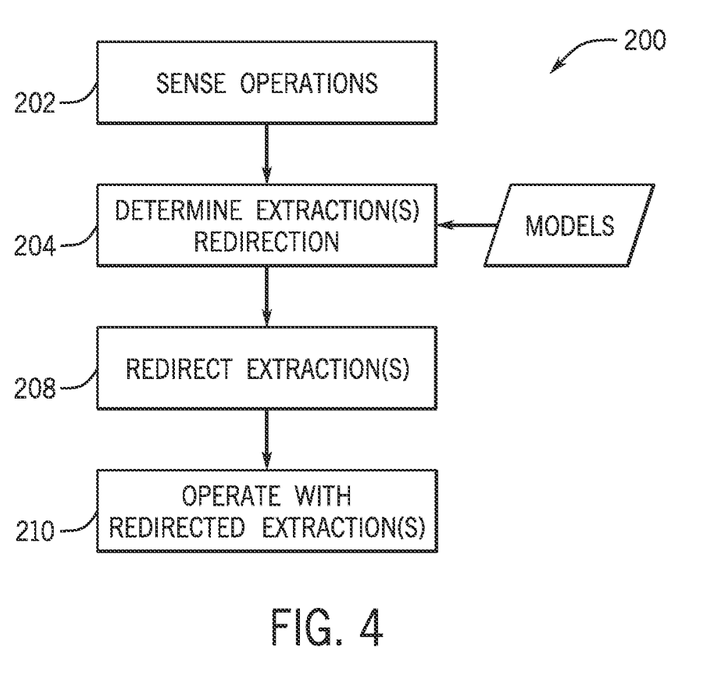
FIG. 4 is a flowchart of an embodiment of a process suitable for redirecting certain extractions for the system of FIG. 1.

FIG. 4 is a flowchart illustrating an embodiment of a process 200 suitable for redirecting certain of the extractions via the via the VBV 25, the compressor interstage bleed system 27, and/or compressor discharge bleed system 29. The process 200 may be implemented as computer code or instructions executable by the processor(s) and stored in the memories 40. In the depicted embodiment, the process 200 may sense (block 202) operations of the power production system 10, including the compressor 20, the turbine 26, the waste heat recovery system 37, and/or any other system included in the power production system 10. Sensing (block 202) operations may include sensing temperatures, pressures, flows, clearances (e.g., distances between stationary and moving components) speeds, accelerations, and so on. Sensing (block 202) operations may also include determining an operation mode for the power production systems, such as startup mode, shutdown, baseload operations, and so on.

The process 200 may then determine (block 204) one or more extractions to redirect. More specifically, the process 200 may determine (block 204) that it would improve energy efficiency to provide for extractions from the VBV 25, the compressor interstage bleed system 27, and/or compressor discharge bleed system 29, to one or more of exhaust section 29, the waste heat recovery system 37, other systems 39, 41, and/or any other location served by the conduits 100, 102, 104, 106, 108, and 110. In certain embodiments, the process 200 may use models 206 to determine (block 204) which extraction(s) to redirect, where to redirect the extractions to, as well as redirection flows, pressures, temperatures, and the like. For example, the models 206 may receive as input data from the sensors 42 and derive current power production system 10 conditions. Based on the conditions, the models 206 may then redirect compressor extractions from the VBV 25, the compressor interstage bleed system 27, and/or compressor discharge bleed system 29, to one or more of exhaust section 29, the waste heat recovery system 37, other systems 39, 41, and/or any other location served by the conduits 100, 102, 104, 106, 108, and 110. For example, if the receiving systems (e.g., exhaust section 29, waste heat recovery system 37, and/or other systems 39, 41) would benefit from receiving external flows for certain operations (e.g., to cool and/or to heat certain fluids), then the process 200 would redirect the compressor extractions.

The models 206 may include physics-based models, such as such as thermodynamic models, low cycle fatigue (LCF) life prediction models, computational fluid dynamics (CFD) models, finite element analysis (FEA) models, solid models (e.g., parametric and non-parametric modeling), and/or 3-dimension to 2-dimension FEA mapping models that may be used to predict the risk of equipment malfunction or the need for equipment maintenance. Models may also include artificial intelligence (AI) models, such as expert systems (e.g. forward chained expert systems, backward chained expert systems), neural networks, fuzzy logic systems, state vector machines (SVMs), inductive reasoning systems, Bayesian inference systems, look-up tables, or a combination thereof. Based on inputs such as sensor 42 data, the models 206 may then output pressures, flow rates, and so on, for extractions to be delivered via the VBV 25, the compressor interstage bleed system 27, and/or compressor discharge bleed system 29, to one or more of exhaust section 29, the waste heat recovery system 37, other systems 39, 41, and/or any other location served by the conduits 100, 102, 104, 106, 108, and 110.

The process 200 may then redirect (block 208) the extractions to the desired systems (e.g., exhaust section 28, waste heat recovery system 37, other systems 39, 41). For example, the process 200 may actuate the actuators 196 to redirect the fluid extractions through the conduits 100, 102, 104, 106, 108, and 110. The actuators 196 may include pumps, pressure reducers, flow restrictions, and the like, suitable for delivering the extractions at desired pressures and/or flow rates. The systems included in the power production system 10 may then be operated (block 210) with redirected extractions. For example, during startup, the waste heat recovery system 37 may benefit from cooler airflows. Accordingly, the VBV 25, the compressor interstage bleed system 27, and/or compressor discharge bleed system 29 may be used to deliver fluid extractions that may be cooler than the exhaust 36, minimizing or eliminating the use of attemperation fans to cool the exhaust 36. Likewise, other systems 39, 41 may operate with cooler (or hotter) fluids delivered via the VBV 25, the compressor interstage bleed system 27, and/or compressor discharge bleed system 29. By redirecting certain extractions, such as compressor 20 extractions, for reuse by other sections and/or systems of the power production system 10, the techniques described herein may provide for improved energy efficiency, reduced maintenance, and lessened equipment costs.

Technical effects of the invention include recirculating compressor discharge fluids from a compressor system to exhaust processing systems, such as waste heat recovery systems. A first bleed system fluidly coupled to a first location in the compressor system, to a second location downstream of the compressor system and upstream of the first exhaust processing system, to a third location in the first exhaust processing system, to a fourth location downstream of the first exhaust processing system, or a combination thereof, and configured to redirect a first compressor extraction from the first location to the second location, to the third location, to the fourth location, or to the combination thereof. By reusing extract fluids (e.g., compressor discharge fluids), the techniques described herein may improve energy use and power production efficiency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power production system, comprising:
a compressor system configured to compress a fluid into a compressed fluid;
a combustor system fluidly coupled to the compressor system and configured to combust the compressed fluid and a fuel to produce a combustion fluid;
a turbine system fluidly coupled to the combustor system and configured to rotatively power a shaft via the combustion fluid and to produce an exhaust stream;
a first exhaust processing system fluidly coupled to the turbine system and configured to receive the exhaust stream;
a first bleed system fluidly coupled to a first location in the compressor system, to a second location downstream of the compressor system and upstream of the first exhaust processing system, to a third location in the first exhaust processing system, to a fourth location downstream of the first exhaust processing system, or a combination thereof, and configured to redirect a first compressor extraction from the first location to the second location, to the third location, to the fourth location, or to the combination thereof, wherein the compressor system comprises a low pressure compressor system and a high pressure compressor system, wherein the low pressure compressor is fluidly coupled to the high pressure compressor upstream of the high pressure compressor, wherein the first bleed system comprises a variable bleed valve (VBV) system, and wherein the fast location comprises a first extraction location downstream of the low pressure compressor and upstream of the high pressure compressor; and
a second bleed system fluidly coupled to a fifth location in the compressor system, to a sixth location downstream of the compressor system and upstream of the first exhaust processing system, to a seventh location in the first exhaust processing system, to an eighth location downstream of the first exhaust processing system, or a combination thereof including the sixth location, and configured to redirect a second compressor extraction from the fifth location to the sixth location, to the seventh location, to the eighth location, or to the combination thereof inclduing the sixth location, wherein the first exhaust processing system comprises a waste heat recovery system configured to produce vapor based on the exhaust stream, wherein the waste heat recovery system comprises a low pressure section configured to produce a low pressure vapor, an intermediate pressure section configured to produce an intermediate pressure vapor, and a high pressure section configured to produce a high pressure vapor, and wherein the third location is inside of the low pressure section, the intermediate pressure section, or the high pressure section, wherein the waste heat recovery system comprises a catalytic converter system configured to remove pollutants from the exhaust stream, and wherein the sixth location is the catalytic converter system.

2. The system of claim 1, comprising a controller including a processor, the processor configured to control operations of the power production system and to redirect the first compressor extraction from the fast location to the second location, to the third location, to the fourth location, or to the combination thereof.

3. Th system of claim 1, comprising a third bleed system fluidly coupled to a ninth location in the compressor system, to a tenth location downstream of the compressor system and upstream of the fast exhaust processing system, to an eleventh location in the first exhaust processing system, to a twelfth location downstream of the first exhaust processing system, or a combination thereof, and configured to redirect a third compressor extraction from the ninth location to the tenth location, to the eleventh location, to the twelfth location, or to the combination thereof.

4. The system of claim 1, comprising a second exhaust processing system disposed downstream or upstream of the first exhaust processing system, wherein the first bleed system is fluidly coupled to the second exhaust processing system and configured to redirect the second compressor extraction to the second exhaust processing system.

5. A power production system, comprising
a controller comprising a processor, wherein the processor is configured to:
a) sense operations of the power production system, wherein the power production system comprises:
a compressor system configured to compress a fluid into a compressed fluid;
a combustor system fluidly coupled to the compressor system and configured to combat the compressed fluid and a fuel to produce a combustion fluid;
a turbine system fluidly coupled to the combustor system and configured to rotatively power a shaft via the combustion fluid and to produce an exhaust stream;
a first exhaust processing system fluidly coupled to the turbine system and configured to receive the exhaust stream; and
a first bleed system fluidly coupled to a first location in the compressor system, to a second location downstream of the compressor system and upstream of the first exhaust processing system, to a third location in the first exhaust processing system, to a fourth location downstream of the first exhaust processing system, or a combination thereof, and configured to redirect a first compressor extraction from the first location to the second location, to the third location, to the fourth location, or to the combination thereof; and
b) redirect the first compressor extraction from the first location to the second location, to the third location, to the fourth location, or to the combination thereof, wherein the compressor system comprises a low pressure compressor system and a high pressure compressor system, wherein the low pressure compressor is fluidly coupled to the high pressure compressor upstream of the high pressure compressor, wherein the first bleed system comprises a variable bleed valve (VBV) system, and wherein the first location comprises a first extraction location down stream of the low pressure compressor and upstream of the high pressure compressor, wherein the processor is configured to redirect the first compressor extraction only during startup operations of the power production system, wherein the power production system comprises a second bleed system fluidly coupled to a fifth location in the compressor system, to a sixth location downstream of the compressor system and upstream of the first exhaust processing system, to a seventh location in the first exhaust processing system, to an eighth location downstream of the first exhaust processing system, or a combination thereof including the sixth location, and wherein the processor is configured to c) redirect a second compressor extraction from the fifth location to the sixth location, to the seventh location, to the eighth location, or to the combination thereof including the sixth location, wherein the first exhaust processing system comprises a waste heat recovery system configured to produce vapor based on the exhaust stream, wherein the waste heat recovery system comprises a low pressure section configured to produce a low pressure vapor, an intermediate pressure section configured to produce an intermediate pressure vapor, and a high pressure section configured to produce a high pressure vapor, and wherein the third location is inside of the low pressure section, the intermediate pressure section, or the high pressure section, wherein the waste heat recovery system comprises a catalytic converter system con aced to remove pollutants from the exhaust stream, and wherein the sixth location is in the catalytic converter system.

6. The system of claim 5, wherein the processor is configured execute a model to redirect the first compressor extraction from the first location to the second location, to the third location to the fourth location, or to the combination thereof.

7. The system of claim 6, wherein the model is configured to input data gathered via sensing the operations of the power production system and to output a pressure for delivery of the compressor extraction.

8. The system of claim 6, wherein the model comprises a physics-based model, an artificial intelligence model, a look-up table, or a combination thereof.

9. The system of claim 5, wherein the power production system comprises a third bleed system fluidly coupled to a ninth location in the compressor system, to a tenth location downstream of the compressor system and upstream of the first exhaust processing system, to an eleventh location in the first exhaust processing system, to a twelfth location downstream of the first exhaust processing system, or a combination thereof, and wherein the processor is configured to d) redirect a third compressor extraction from the ninth location to the tenth location, to the eleventh location, to the twelfth location, or to the combination thereof.

10. A method for controlling power production operations, comprising:
a) sensing operations of a power production system via a processor, wherein the power production system comprises:

a compressor system configured to compress a fluid into a compressed fluid;

a combustor system fluidly coupled to the compressor system and configured to combust the compressed fluid and fuel to produce a combustion fluid;

a turbine system fluidly coupled to the combustor system and configured to rotatively power a shaft via the combustion fluid and to produce an exhaust stream;

a first exhaust processing system fluidly coupled to the turbine system and configured to receive the exhaust stream; and a first bleed system fluidly coupled to a first location in the compressor system, to a second location downstream of the compressor system and upstream of the first exhaust processing system, to a third location in the first exhaust processing system, to a fourth location downstream of the first exhaust processing system, or a combination thereof, and configured to redirect a first compressor extraction from the first location to the second location, to the third location, to the fourth location, or to the combination thereof; and b) redirecting, via the processor, the first compressor extraction from the first location to the second location, to the third location, to the fourth location, or to the combination thereof, wherein the compressor system comprises a low pressure compressor system and a high pressure compressor system, wherein the low pressure compressor is fluidly coupled to the high pressure compressor upstream of the high pressure compressor, wherein the first bleed system comprises a variable bleed valve (VBV) system, and wherein the first location comprises a first extraction location downstream of the low pressure compressor and upstream of the high pressure compressor, wherein the processor is configured to redirect the first compressor extraction only during startup operations of the power production system, wherein the power production system comprises a second bleed system fluidly coupled to a fifth location in the compressor system, to a sixth location downstream of the compressor system and upstream of the first exhaust processing system, to a seventh location in the first exhaust processing system, or a combinatin thereof including the sixth location, and the method comprises c) redirecting, via the processor, a second compressor extraction from the fifth location to the sixth location, to the seventh location, to the eighth location, or to the combination thereof including the sixth location, wherein the first exhaust processing system comprises a waste heat recovery system configured to produce vapor based on the exhaust system, wherein the waste heat recovery system comprises a low pressure section configured to produce a low pressure vapor, an intermediate pressure section configured to produce an intermediate pressure vapor, and a high pressure system configured to produce a high pressure vapor, and wherein the third location is inside of the low pressure section, the intermediate pressure section, or the high pressure section, wherein the waste heat recovery system comprises a catalytic converter system configured to remove pollutants from the exhaust stream, and wherein the sixth location is in the catalytic converter system.

11. The method of claim 10, wherein the power production system comprises a third bleed system fluidly coupled to a ninth location in the compressor system, to a tenth location downstream of the compressor system and upstream of the first exhaust processing system, to an eleventh location in the first exhaust processing system, to a twelfth location downstream of the first exhaust processing system, or a combination thereof, and the method comprises d) redirecting a third compressor extraction from the ninth location to the tenth location, to the eleventh location, to the twelfth location, or to the combination thereof.

12. The method of claim 10, comprising executing a model, via the processor, to redirect the first compressor extraction from the first location to the second location, to the third location, to the fourth location, or to the combination thereof.

* * * * *